US012358080B2

(12) United States Patent
Moon et al.

(10) Patent No.: US 12,358,080 B2
(45) Date of Patent: Jul. 15, 2025

(54) MASK ASSEMBLY AND METHOD OF MANUFACTURING THE SAME

(71) Applicant: Samsung Display Co., Ltd., Yongin-Si (KR)

(72) Inventors: Minho Moon, Seongnam-si (KR); Youngmin Moon, Yongin-si (KR); Seungyong Song, Suwon-si (KR); Sungsoon Im, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 646 days.

(21) Appl. No.: 17/392,558

(22) Filed: Aug. 3, 2021

(65) Prior Publication Data

US 2022/0152748 A1     May 19, 2022

(30) Foreign Application Priority Data

Nov. 18, 2020  (KR) .................. 10-2020-0154784

(51) Int. Cl.
  *B23K 31/02*   (2006.01)
  *B05C 21/00*   (2006.01)
  (Continued)

(52) U.S. Cl.
  CPC ............ *B23K 31/02* (2013.01); *B05C 21/005* (2013.01); *C03C 17/32* (2013.01);
  (Continued)

(58) Field of Classification Search
  None
  See application file for complete search history.

(56) References Cited

U.S. PATENT DOCUMENTS 6,146,489 A * 11/2000 Wirth ............... H01L 31/02322
                                                       427/75
6,926,840 B2 * 8/2005 Clark .................. C23C 14/042
                                                       438/237

(Continued)

FOREIGN PATENT DOCUMENTS

CN     108779550 A     11/2018
CN     110268090 A     9/2019
(Continued)

*Primary Examiner* — Jethro M. Pence
(74) *Attorney, Agent, or Firm* — CANTOR COLBURN LLP (57) ABSTRACT

A mask assembly includes: a mask frame provided with a first opening defined through a center portion thereof and including an outer frame surrounding the first opening and provided with at least one concave portion defined therein; a mask body disposed to correspond to the first opening and provided with second openings defined therethrough and having an area smaller than the first opening; a first sub-mask disposed on the mask body, provided with third openings defined therethrough over an entire area thereof and having an area smaller than each of the second openings, and including a metal material; a second sub-mask disposed on the first sub-mask, provided with fourth openings defined therethrough over an entire area thereof and having an area smaller than each of the third openings in a plane, and including a polymer material; and a welding portion disposed on the second sub-mask in the concave portion.

17 Claims, 11 Drawing Sheets (51) Int. Cl.
  *C03C 17/32* (2006.01)
  *B23K 101/24* (2006.01)
  *B23K 103/02* (2006.01)
(52) U.S. Cl.
  CPC ...... *B23K 2101/24* (2018.08); *B23K 2103/02* (2018.08); *C03C 2218/33* (2013.01); *C03C 2218/34* (2013.01)

(56) References Cited

U.S. PATENT DOCUMENTS

| | | | | |
|---|---|---|---|---|
| 8,402,917 | B2 * | 3/2013 | Ko | C23C 14/042 |
| | | | | 228/180.1 |
| 9,321,074 | B2 * | 4/2016 | Ko | B05C 11/00 |
| 9,379,324 | B2 | 6/2016 | Takeda et al. | |
| 9,695,500 | B2 * | 7/2017 | Ko | H10K 71/00 |
| 9,748,485 | B2 | 8/2017 | Lee | |
| 9,953,828 | B2 * | 4/2018 | Oh | B05C 21/005 |
| 9,982,333 | B2 | 5/2018 | Nam et al. | |
| 10,195,838 | B2 | 2/2019 | Saito et al. | |
| 10,787,729 | B2 * | 9/2020 | Bai | C23C 14/24 |
| 10,920,311 | B2 | 2/2021 | Kudo et al. | |
| 11,545,626 | B2 * | 1/2023 | Kim | C23C 14/042 |
| 11,746,406 | B2 * | 9/2023 | Yang | H01L 21/682 |
| | | | | 118/721 |
| 11,937,492 | B2 * | 3/2024 | Lee | G03F 7/0015 |
| 2004/0123799 | A1 * | 7/2004 | Clark | C23C 14/12 |
| | | | | 118/504 |
| 2010/0267227 | A1 * | 10/2010 | Ko | C23C 14/042 |
| | | | | 156/60 |
| 2014/0033975 | A1 * | 2/2014 | Oh | B05C 21/005 |
| | | | | 118/504 |
| 2020/0259126 | A1 | 8/2020 | Moon et al. | |
| 2023/0058121 | A1 * | 2/2023 | Moon | C23C 14/042 |

FOREIGN PATENT DOCUMENTS

| | | |
|---|---|---|
| JP | 2018053348 A | 4/2018 |
| JP | 2019049058 A | 3/2019 |
| KR | 20160000069 A | 1/2016 |
| KR | 1020160117449 A | 10/2016 |
| KR | 20170045427 A | 4/2017 |
| KR | 1020180047594 A | 5/2018 |
| KR | 102097574 B1 | 4/2020 |
| KR | 20200097375 A | 8/2020 |
| KR | 102183116 B1 | 11/2020 |
| TW | M473398 U | 3/2014 |

* cited by examiner

MASK ASSEMBLY AND METHOD OF MANUFACTURING THE SAME

This application claims priority to Korean Patent Application No. 10-2020-0154784, filed on Nov. 18, 2020, and all the benefits accruing therefrom under 35 U.S.C. § 119, the content of which in its entirety is herein incorporated by reference.

BACKGROUND

1. Field of Disclosure

The present disclosure relates to a mask assembly and a method of manufacturing the same. More particularly, the present disclosure relates to a mask assembly including a polyimide layer and a method of manufacturing the mask assembly.

2. Description of the Related Art

A display panel includes a plurality of pixels. Each of the pixels includes a driving device, such as a transistor, and a display element, such as an organic light emitting diode. The display element is formed by stacking an electrode and a light emission pattern on a substrate.

The light emission pattern is patterned to be formed in a predetermined area using a mask through which holes are defined. The light emission pattern is formed in areas exposed through the holes. The light emission pattern has a shape determined by a shape of the holes. Technologies are being developed regarding a material and a manufacturing method for a large area mask to increase the production yield of display panels including light emitting patterns.

SUMMARY

The present disclosure provides a mask assembly having low weight and large size.

The present disclosure provides a method of manufacturing the mask assembly.

Embodiments of the inventive concept provide a mask assembly including: a mask frame provided with a first opening defined through a center portion thereof and including an outer frame surrounding the first opening and provided with at least one concave portion defined therein; a mask body disposed to correspond to the first opening and provided with a plurality of second openings defined therethrough and having an area smaller than the first opening in a plan view; a first sub-mask disposed on the mask body, provided with a plurality of third openings defined therethrough over an entire area thereof, and including a metal material, where each of the plurality of third openings has an area smaller than each of the second openings in the plan view; a second sub-mask disposed on the first sub-mask, provided with a plurality of fourth openings defined therethrough over an entire area thereof, and including a polymer material, where each of the plurality of fourth openings has an area smaller than each of the third openings in the plan view; and a welding portion disposed on the second sub-mask and in the concave portion.

The second sub-mask may include polyimide.

The second sub-mask may have a thermal expansion coefficient equal to or smaller than about 2 parts per million per degree in Celsius (ppm/° C.).

The fourth openings may be defined to correspond to the third openings, respectively.

The second openings may overlap the third openings in the plan view.

The first sub-mask may include a plurality of first metal lines extending in a first direction and arranged in a second direction perpendicular to the first direction and a plurality of second metal lines extending in the second direction and arranged in the first direction, and each of the first metal lines may cross each of the second metal lines.

Each of the first metal lines may be interlaced with the second metal lines by alternately passing over and under, and each of the second metal lines may be interlaced with the first metal lines by alternately passing over and under.

Each of the third openings may have an area equal to or greater than an area of each of the fourth openings in the plan view.

The first sub-mask may have a thickness equal to or greater than about 2 micrometers (μm) and equal to or smaller than about 5 μm.

The second sub-mask may have a thickness equal to or greater than about 5 μm and equal to or smaller than about 30 μm.

The concave portion may have a depth which is greater than a sum of a thickness of the first sub-mask, a thickness of the second sub-mask, and a thickness of the welding portion in a thickness direction of the outer frame.

The concave portion may include a curved surface portion in a cross-section.

Embodiments of the inventive concept provide a mask assembly including: a mask frame provided with a first opening defined through a center portion thereof and including an outer frame surrounding the first opening and provided with at least one concave portion defined therein; a mask body disposed to correspond to the first opening and provided with a plurality of second openings defined therethrough and having an area smaller than the first opening in a plan view; a first sub-mask disposed on the mask body, provided with a plurality of third openings defined therethrough over an entire area thereof, and including a metal material, where each of the plurality of third openings has an area smaller than each of the second openings in the plan view; a second sub-mask disposed on the first sub-mask, provided with a plurality of fourth openings defined therethrough over an entire area thereof, and including a polymer material, where each of the plurality of fourth openings has an area smaller than each of the third openings in the plan view; and at least one welding portion disposed on the second sub-mask. The outer frame includes: a first portion which overlaps the first sub-mask, the second sub-mask, and the welding portion in the plan view; and a second portion which overlaps the first sub-mask and the second sub-mask and does not overlap the welding portion in the plan view. The first portion has a thickness smaller than a thickness of the second portion.

The at least one concave portion may be provided with plural. The first portion may be provided with the plurality of concave portions recessed in a thickness direction, the welding portion may be provided in plural, and the welding portions may correspond to the concave portions, respectively.

The second sub-mask may include polyimide.

The mask frame and the mask body may include the same metal material.

The metal material may be Invar.

Embodiments of the inventive concept provide a method of manufacturing a mask assembly. The method includes: providing a mask frame provided with a first opening defined through a center portion thereof and including an outer frame surrounding the first opening and provided with at least one concave portion defined therein; disposing a mask body to correspond to the first opening of the mask frame, where the mask body is provided with a plurality of second openings defined therethrough and has an area smaller than the first opening in the plan view; disposing a first sub-mask, which is provided with a plurality of third openings defined therethrough over an entire area thereof, on the mask body, wherein each of the plurality of third openings has an area smaller than each of the second openings in the plan view; disposing a second sub-mask, which is provided with a plurality of fourth openings defined therethrough over an entire area thereof, on the first sub-mask, where each of the plurality of fourth openings has an area smaller than each of the third openings in the plan view; disposing a metal stick on the second sub-mask and in the concave portion, and welding the mask frame, the first sub-mask, the second sub-mask, and the metal stick in an area overlapping the concave portion in the plan view.

The disposing of the first sub-mask may include tensioning the first sub-mask such that the concave portion overlaps the first sub-mask in the plan view.

The disposing of the second sub-mask may include tensioning the second sub-mask such that the concave portion overlaps the second sub-mask and the third openings overlap the fourth openings in the plan view, respectively.

The disposing of the second sub-mask on the first sub-mask may include providing a glass substrate, providing a polymer layer on the glass substrate, patterning the polymer layer such that the polymer layer is provided with the fourth openings defined therethrough to form the second sub-mask, disposing the second sub-mask on the first sub-mask such that the glass substrate is exposed to an outside, and removing the exposed glass substrate.

The patterning of the polymer layer may be performed by a laser etching method or a dry etching method.

According to the above, as the mask assembly includes the mask formed of or including the polymer material and the mask formed of or including the metal material, the mask assembly having large size and low weight is provided.

The manufacturing method of the mask assembly includes the disposing of the mask formed of or including the polymer material on the mask formed of the metal material, and thus, the mask assembly having large size and low weight is provided.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

The present disclosure may be variously modified and realized in many different forms, and thus specific embodiments will be exemplified in the drawings and described in detail hereinbelow. However, the present disclosure should not be limited to the specific disclosed forms, and be construed to include all modifications, equivalents, or replacements included in the spirit and scope of the present disclosure.

In the present disclosure, it will be understood that when an element or layer is referred to as being "on", "connected to" or "coupled to" another element or layer, it can be directly on, connected or coupled to the other element or layer or intervening elements or layers may be present.

In the present disclosure, when an element is referred to as being "directly disposed" to another element, there are no intervening elements present between a layer, film region, or substrate and another layer, film, region, or substrate. For example, the term "directly disposed" may mean that two layers or two members are disposed without employing additional adhesive therebetween.

Like numerals refer to like elements throughout. In the drawings, the thickness, ratio, and dimension of components are exaggerated for effective description of the technical content.

As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another element(s) or feature(s) as shown in the figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a mask assembly and a method of manufacturing the mask assembly will be described with reference to accompanying drawings.

Figure 1:
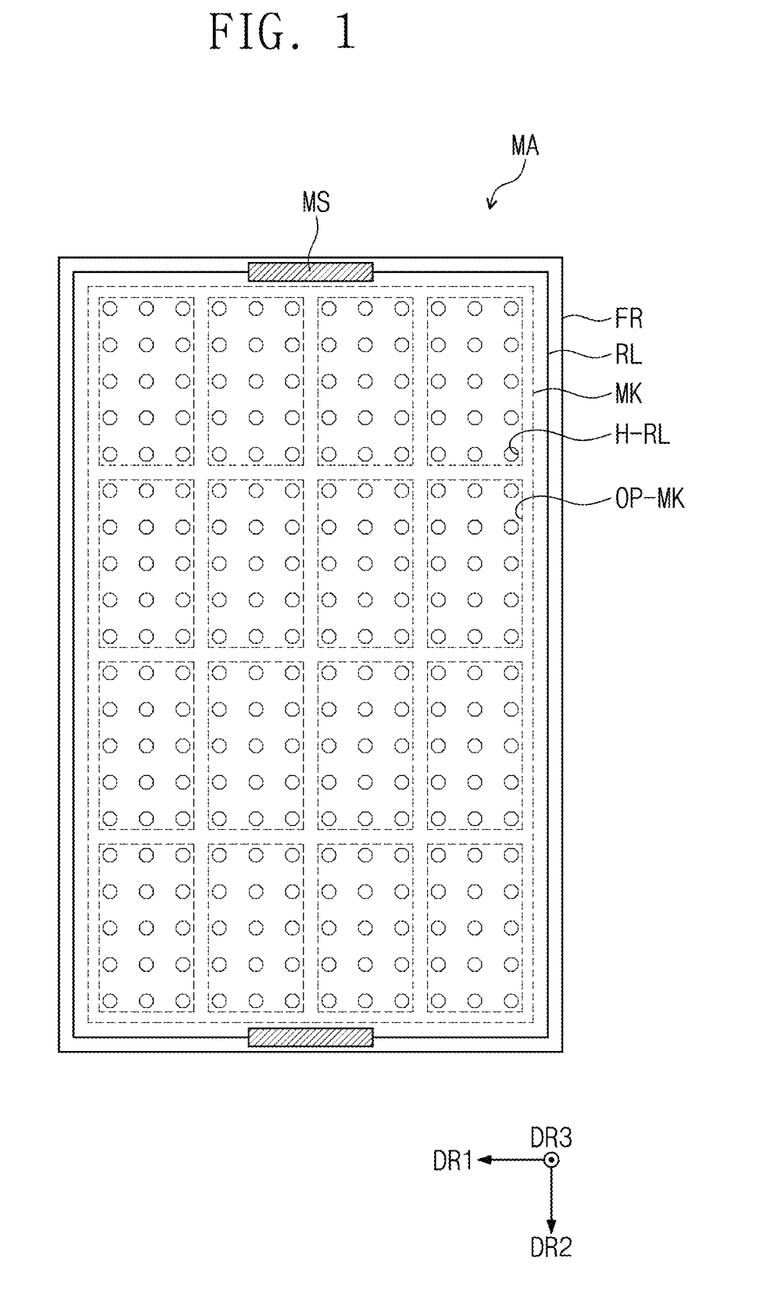
FIG. 1 is a plan view showing a mask assembly according to an embodiment of the present disclosure.
Figure 2:
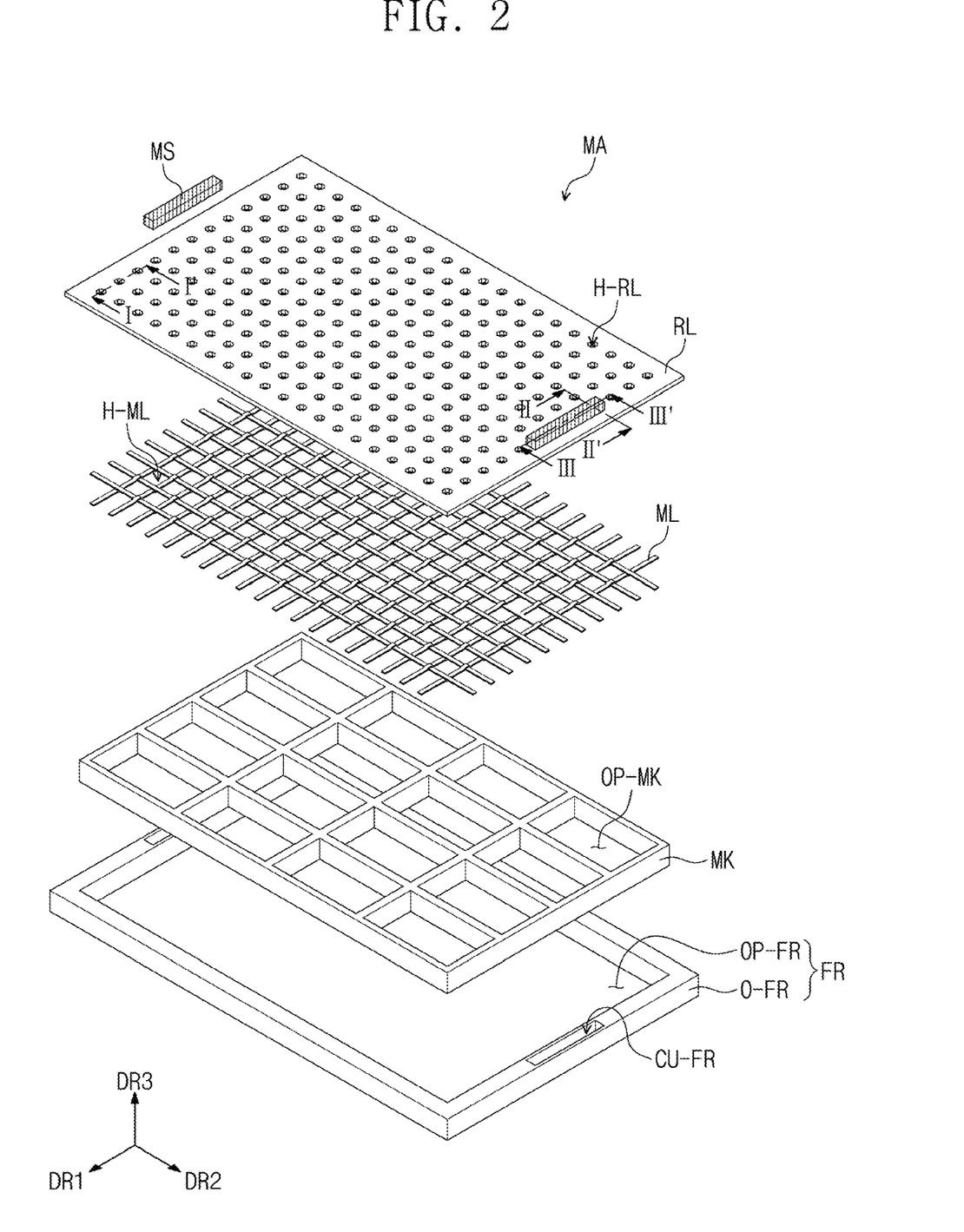
FIG. 2 is an exploded perspective view showing a mask assembly according to an embodiment of the present disclosure.

FIG. 1 is a plan view showing a mask assembly MA according to an embodiment of the present disclosure. FIG. 2 is an exploded perspective view showing the mask assembly MA according to an embodiment of the present disclosure.

Referring to FIGS. 1 and 2, the mask assembly MA includes a mask frame FR, a mask body MK, a first sub-mask ML, a second sub-mask RL, and a welding portion MS.

The mask frame FR may be provided with a first opening OP-FR defined through a center portion thereof in a thickness direction (i.e., third direction DR3) when viewed in a plane (i.e., in a plan view) and may include an outer frame O-FR surrounding the first opening OP-FR. The outer frame O-FR may have a quadrangular shape, and the first opening OP-FR may have a shape determined depending on the shape of the outer frame O-FR. A length of a side (i.e., latitudinal side) of the outer frame O-FR, which extends in a first direction DR1, may be smaller than a length of a side (i.e., longitudinal side) of the outer frame O-FR, which extends in a second direction DR2. In FIG. 2, the outer frame O-FR has the quadrangular shape when viewed in the plane, however, this is merely one example, and the present disclosure according to the invention should not be limited thereto or thereby. For example, the shape of the outer frame O-FR may include a curved portion in another embodiment.

The mask frame FR may include at least one concave portion CU-FR defined in one side of the outer frame O-FR. The concave portion CU-FR may be a recessed portion recessed from the one side of the outer frame O-FR along the thickness direction (i.e., third direction DR3). The concave portion CU-FR may have a rectangular shape in which a length of a side extending in the first direction DR1 is greater than a length of a side extending in the second direction DR2 in a plane, however, this is merely one example, and the present disclosure according to the invention should not be limited thereto or thereby. As another example, the concave portion CU-FR may have a square shape in which a length of a side extending in the first direction DR1 is the same as a length of a side extending in the second direction DR2 in a plane, a rectangular shape in which a length of a side extending in the first direction DR1 is smaller than a length of a side extending in the second direction DR2 in a plan view, or a shape including a curved portion.

The mask frame FR may be formed of or include Invar; however, this is merely one example. That is, a material for the mask frame FR according to the invention should not be limited to Invar as long as the material may accommodate the mask body MK and may support the first sub-mask ML and the second sub-mask RL, which are disposed on the mask frame FR.

Directions indicated by first, second, and third directional DR1, DR2, and DR3 in the present disclosure may be relative to each other and may be changed to other directions. The mask body MK may be disposed to correspond to the first opening OP-FR defined through the mask frame FR. That is, the mask body MK may have a shape corresponding to the shape of the first opening OP-FR defined through the mask frame FR when viewed in a plane (i.e., in a plan view). A width in the first direction DR1 of the mask body MK and a width in the second direction DR2 of the mask body MK may be smaller than a width in the first direction DR1 of the outer frame O-FR and a width in the second direction DR2 of the outer frame O-FR, respectively. A length of a side extending in the first direction DR1 of the mask body MK may be smaller than a length of a side extending in the second direction DR2 of the mask body MK, however, this is merely one example, and the present disclosure according to the invention should not be limited thereto or thereby.

The mask body MK may be provided with a plurality of second openings OP-MK defined therethrough along the thickness direction (i.e., third direction DR3). Each of the second openings OP-MK may have an area smaller than an area of the first opening OP-FR in a plane (i.e., in a plan view). All the second openings OP-MK may overlap the first opening OP-FR in a plan view. In FIG. 2, the second opening OP-MK having the rectangular shape when viewed in a plane is shown, however, this is merely one example, and the present disclosure according to the invention should not be limited thereto or thereby. In another embodiment, for example, the second opening OP-MK may have a circular shape, a square shape, or a polygonal shape when viewed in a plane (i.e., in a plan view).

The mask body MK may include the same material as that of the mask frame FR. The mask body MK may be formed of or include Invar; however, this is merely one example. According to another embodiment, the mask body MK and the mask frame FR may include different materials having similar thermal expansion coefficient to each other. When the thermal expansion coefficient of the mask body MK is similar to the thermal expansion coefficient of the mask frame FR, it is possible to reduce a risk of damage to the mask assembly MA during a tensioning process of the first sub-mask ML or the second sub-mask RL, which will be described later.

The first sub-mask ML may be disposed on the mask body MK. A width in the second direction DR2 of the first sub-mask ML may be smaller than a width in the second direction DR2 of the mask frame FR. The first sub-mask ML may be formed of or include a metal material. For example, the first sub-mask ML may be formed of or include Invar.

The first sub-mask ML may be provided with a plurality of third openings H-ML defined therethrough over an entire area of the first sub-mask ML. When viewed in a plane (i.e., in a plan view), each of the third openings H-ML may have an area smaller than the area of each of the second openings OP-MK in a plan view. Plural third openings H-ML may overlap one second opening OP-MK in a plan view. As shown in FIG. 2, each of the third openings H-ML may have a quadrangular shape when viewed in a plan view, however, this is merely one example, and the present disclosure according to the invention should not be limited thereto or thereby.

The second sub-mask RL may be disposed on the first sub-mask ML. A width in the second direction DR2 of the second sub-mask RL may be smaller than the width in the second direction DR2 of the mask frame FR. The second sub-mask RL may include a polymer material. The polymer material may have a thermal expansion coefficient equal to or smaller than about 2 parts per million per degree in Celsius (ppm/° C.). For example, the second sub-mask RL may include polyimide.

The second sub-mask RL may be provided with a plurality of fourth openings H-RL defined therethrough along the thickness direction (i.e., third direction DR3) over an entire area of the second sub-mask RL. When viewed in a plane (i.e., in a plan view), each of the fourth openings H-RL may have an area smaller than the area of each of the third openings H-ML. As shown in FIG. 2, each of the fourth openings H-RL may have an octagonal shape when viewed in a plan view, however, this is merely one example, and the present disclosure according to the invention should not be limited thereto or thereby. According another embodiment, each of the fourth opening H-RL may have a circular shape, a quadrangular shape, or a polygonal shape when viewed in a plane (i.e., in a plan view).

In a case where the mask assembly includes only the second sub-mask RL formed of or including the polymer material, a vertical movement by a magnet placed above the second sub-mask RL may be restricted in a deposition process, and thus, the use of the mask assembly may be limited in the deposition process. As the first sub-mask ML formed of or including the metal material is disposed under the second sub-mask RL formed of or including the polymer material, the second sub-mask RL may move together with the first sub-mask ML in the deposition process by the first sub-mask ML vertically moving by the magnet placed above the second sub-mask RL, and thus, the use of the mask assembly MA may increase in the deposition process.

The welding portion MS may be disposed on the second sub-mask RL. The welding portion MS may overlap the first sub-mask ML, the second sub-mask RL, and the outer frame O-FR in a plan view. The welding portion MS may be disposed at a portion where the second sub-mask RL overlaps the concave portion CU-FR of the outer frame O-FR in a plan view. The welding portion MS may be formed of or include Invar.

Figure 3:
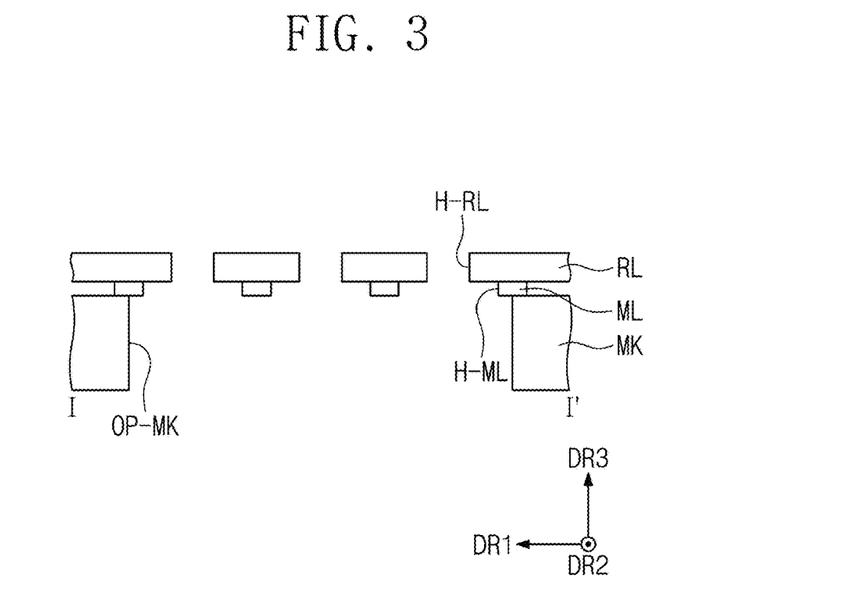
FIG. 3 is a cross-sectional view taken along line I-I' shown in FIG. 2 to show a mask assembly according to an embodiment of the present disclosure.
Figure 4:
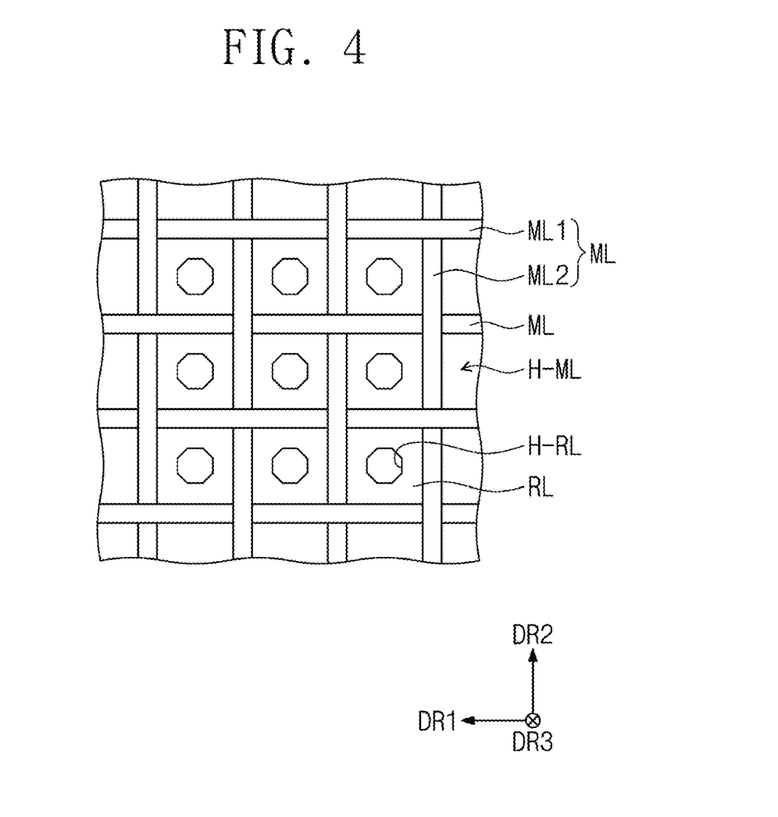
FIG. 4 is a plan view showing the mask assembly shown in FIG. 3 when viewed from a bottom of the mask assembly.

FIG. 3 is a cross-sectional view taken along line I-I' shown in FIG. 2 to show the mask assembly according to an embodiment of the present disclosure, and FIG. 4 is a plan view showing the mask assembly shown in FIG. 3 when viewed from a bottom of the mask assembly.

Referring to FIGS. 3 and 4, the first sub-mask ML may include a plurality of first metal lines ML1 extending in the first direction DR1 and arranged in the second direction DR2 and a plurality of second metal lines ML2 extending in the second direction DR2 and arranged in the first direction DR1. Each of the first metal lines ML1 may extend in the first direction DR1 and may be interlaced with the second metal lines ML2 by alternately passing over and under each other, and each of the second metal lines ML2 may extend in the second direction DR2 and may be interlaced with the first metal lines ML1 by alternately passing over and under each other. That is, the first metal lines ML1 may cross the second metal lines ML2 to form a lattice structure. The third openings H-ML may be defined in areas defined by the metal lines extending in the first direction DR1 and the metal lines extending in the second direction DR2.

In the mask assembly MA, the second opening OP-MK, the third opening H-ML, and the fourth opening H-RL may overlap each other in a plan view. One second opening OP-MK may overlap plural third openings H-ML and plural fourth openings H-RL in a plan view. In the second sub-mask RL, each of the fourth openings H-RL may be defined in areas to correspond to each of the third openings H-ML. That is, the third openings H-ML may be defined to correspond to the fourth openings H-RL in a one-to-one correspondence. An area of each of the third openings H-ML may be equal to or greater than an area of each of the fourth openings H-RL. That is, the fourth openings H-RL may be entirely exposed through the third openings H-ML in a plan view.

Figure 5:
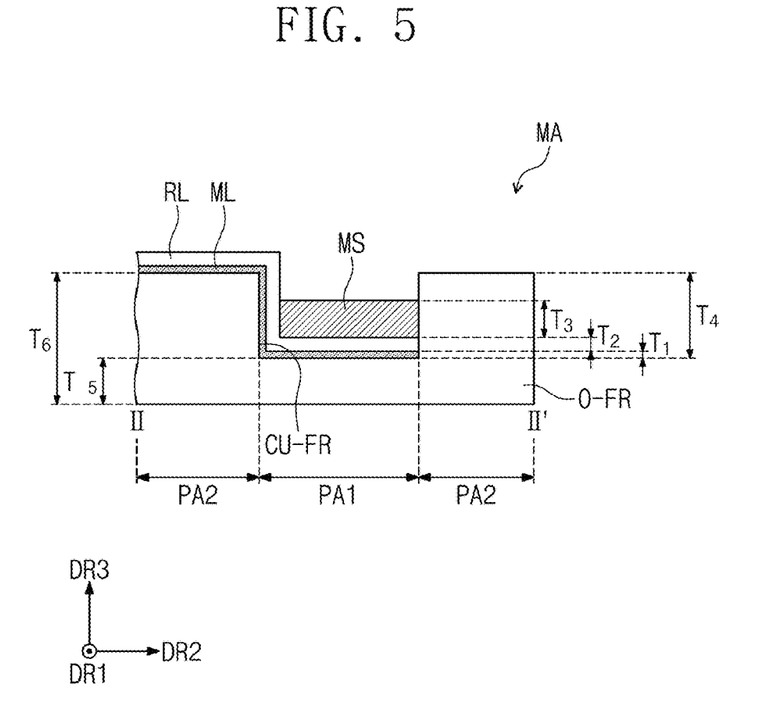
FIG. 5 is a cross-sectional view taken along line II-II' shown in FIG. 2 to show a mask assembly according to an embodiment of the present disclosure.
Figure 6:
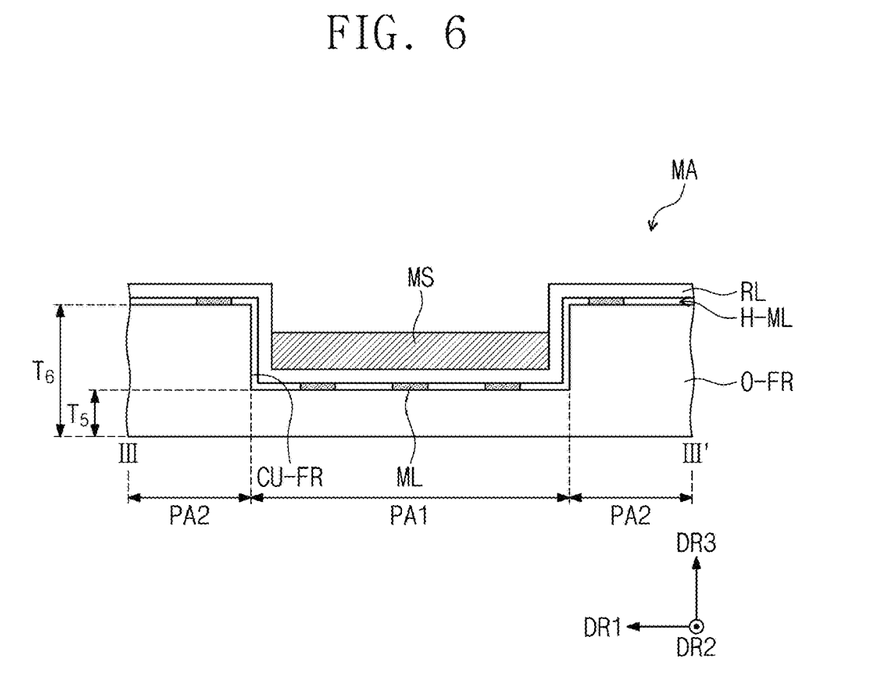
FIG. 6 is a cross-sectional view taken along line III-III' shown in FIG. 2 to show a mask assembly according to an embodiment of the present disclosure.

FIG. 5 is a cross-sectional view taken along line II-II' shown in FIG. 2 to show the mask assembly according to an embodiment of the present disclosure, and FIG. 6 is a cross-sectional view taken along line III-III' shown in FIG. 2 to show the mask assembly according to an embodiment of the present disclosure.

Referring to FIGS. 5 and 6, the first sub-mask ML may have a thickness $T_1$ smaller than a thickness $T_2$ of the second sub-mask RL in the third direction DR3. The thickness $T_1$ of the first sub-mask ML may be equal to or greater than about 2 micrometers (μm) and equal to or smaller than about 5 μm. The thickness $T_2$ of the second sub-mask RL may be equal to or greater than about 5 μm and equal to or smaller than about 30 μm.

The concave portion CU-FR defined by being recessed in the thickness direction (i.e., third direction DR3) of the outer frame O-FR may have a depth $T_4$ that is greater than a sum of the thickness $T_1$ of the first sub-mask ML, the thickness $T_2$ of the second sub-mask RL, and a thickness $T_3$ of the welding portion MS. As the depth $T_4$ of the concave portion CU-FR in the third direction DR3 is greater than the sum of the thickness $T_1$ of the first sub-mask ML, the thickness $T_2$ of the second sub-mask RL, and the thickness $T_3$ of the welding portion MS, the welding portion MS disposed on the second sub-mask RL may not protrude from the top surface of the outer frame O-FR in the thickness direction (i.e., third direction DR3). That is, the welding portion MS may be disposed in the concave portion CU-FR.

According to an embodiment, the outer frame O-FR may include a first portion PA1 that overlaps the welding portion MS and a second portion PA2 that does not overlap the welding portion MS in a plan view. The first portion PA1 may have a thickness $T_5$ smaller than a thickness $T_6$ of the second portion PA2. The concave portion CU-FR may be defined in the first portion PA1 due to a difference in thickness between the first portion PA1 and the second portion PA2. According to an embodiment, one concave portion CU-FR may be defined in the outer frame O-FR, and one welding portion MS may be disposed to correspond to the concave portion CU-FR. However, this is merely one example, and the present disclosure according to the invention should not be limited thereto or thereby. For example, according to another embodiment, a plurality of welding portions may be disposed to correspond to the concave portion CU-FR.

Figure 7:
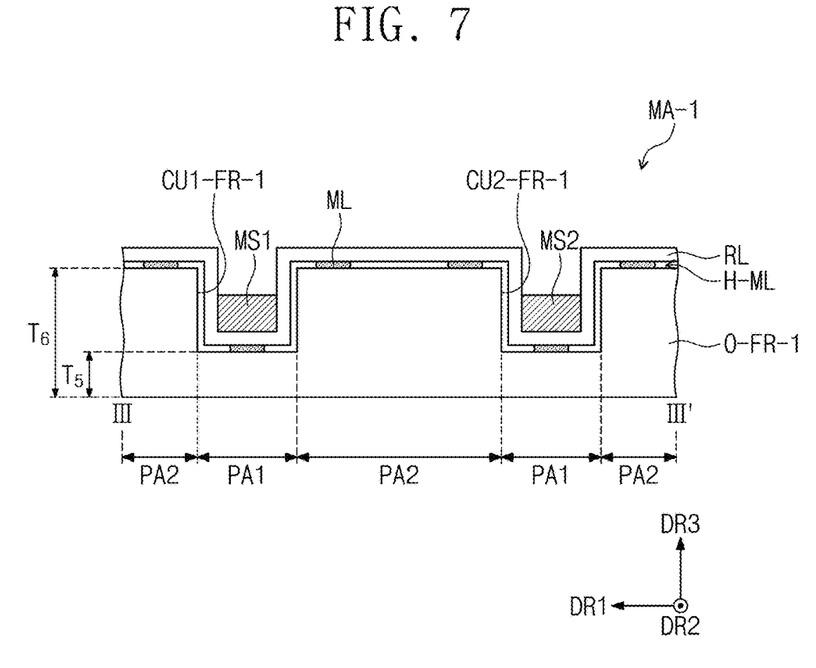
FIG. 7 is a cross-sectional view taken along line III-III' shown in FIG. 2 to show a mask assembly according to another embodiment of the present disclosure.

FIG. 7 is a cross-sectional view taken along line III-III' shown in FIG. 2 to show a mask assembly MA-1 according to another embodiment of the present disclosure. Hereinafter, the mask assembly MA-1 will be described in detail with reference to FIG. 7. In FIG. 7, the same descriptions as those described with reference to FIGS. 1 to 6 will be omitted, and different features will be mainly described.

Different from the mask assembly MA shown in FIGS. 1 to 6, the mask assembly MA-1 shown in FIG. 7 may include a plurality of concave portions CU1-FR-1 and CU2-FR-1 defined in an outer frame O-FR-1 and a plurality of welding portions MS1 and MS2 disposed in the concave portions CU1-FR-1 and CU2-FR-1, respectively.

Referring to FIG. 7, the mask assembly MA-1 may include the concave portions CU1-FR-1 and CU2-FR-1 defined in the outer frame O-FR-1. The welding portions MS1 and MS2 may be disposed in the concave portions CU1-FR-1 and CU2-FR-1, respectively. FIG. 7 shows two concave portions CU1-FR-1 and CU2-FR-1 and two welding portions MS1 and MS2, however, this is merely one example, and the present disclosure according to the invention should not be limited thereto or thereby. For example, according to another embodiment, the mask assembly may include three or more concave portions defined in the outer frame and three or more welding portions disposed in the concave portions, respectively.

Figure 8:
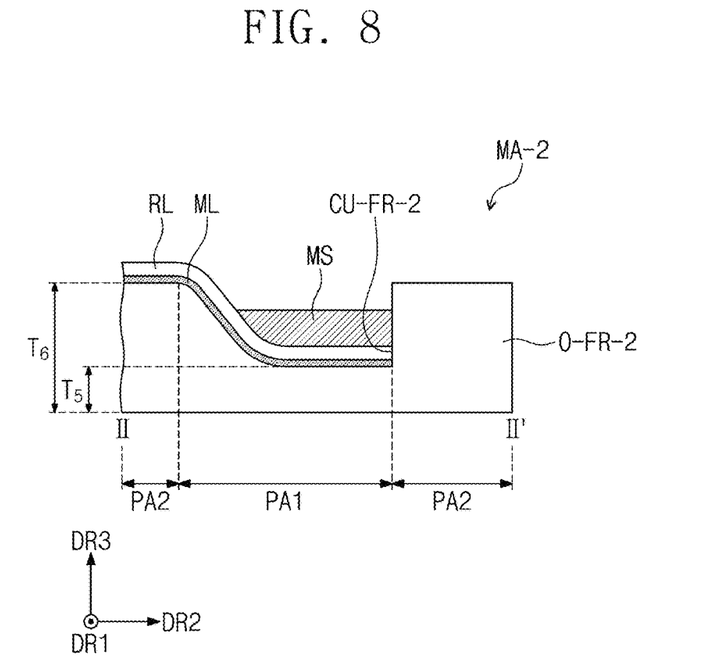
FIG. 8 is a cross-sectional view taken along line II-II' shown in FIG. 2 to show a mask assembly according to another embodiment of the present disclosure.

FIG. 8 is a cross-sectional view taken along line II-II' shown in FIG. 2 to show a mask assembly MA-2 according to another embodiment of the present disclosure. Hereinafter, the mask assembly MA-2 will be described in detail with reference to FIG. 8. In FIG. 8, the same descriptions as those described with reference to FIGS. 1 to 6 will be omitted, and different features will be mainly described.

Different from the mask assembly MA shown in FIGS. 1 to 6, the mask assembly MA-2 shown in FIG. 8 may include a concave portion CU-FR-2 defined in an outer frame O-FR-2 and having a curved surface shape when viewed in a cross-section.

Referring to FIG. 8, the mask assembly MA-2 may include the concave portion CU-FR-2 having a curved portion CP and defined in the outer frame O-FR-2 by being recessed in the thickness direction (i.e., third direction DR3). The curved portion CP may be adjacent to a surface close to the first opening OP-FR (refer to FIG. 2) of the outer frame O-FR-2. As the concave portion CU-FR-2 includes the curved portion CP, damage to the first sub-mask ML and the second sub-mask RL may be reduced when compared with the concave portion CU-FR-2 having an angular shape.

Figure 9:
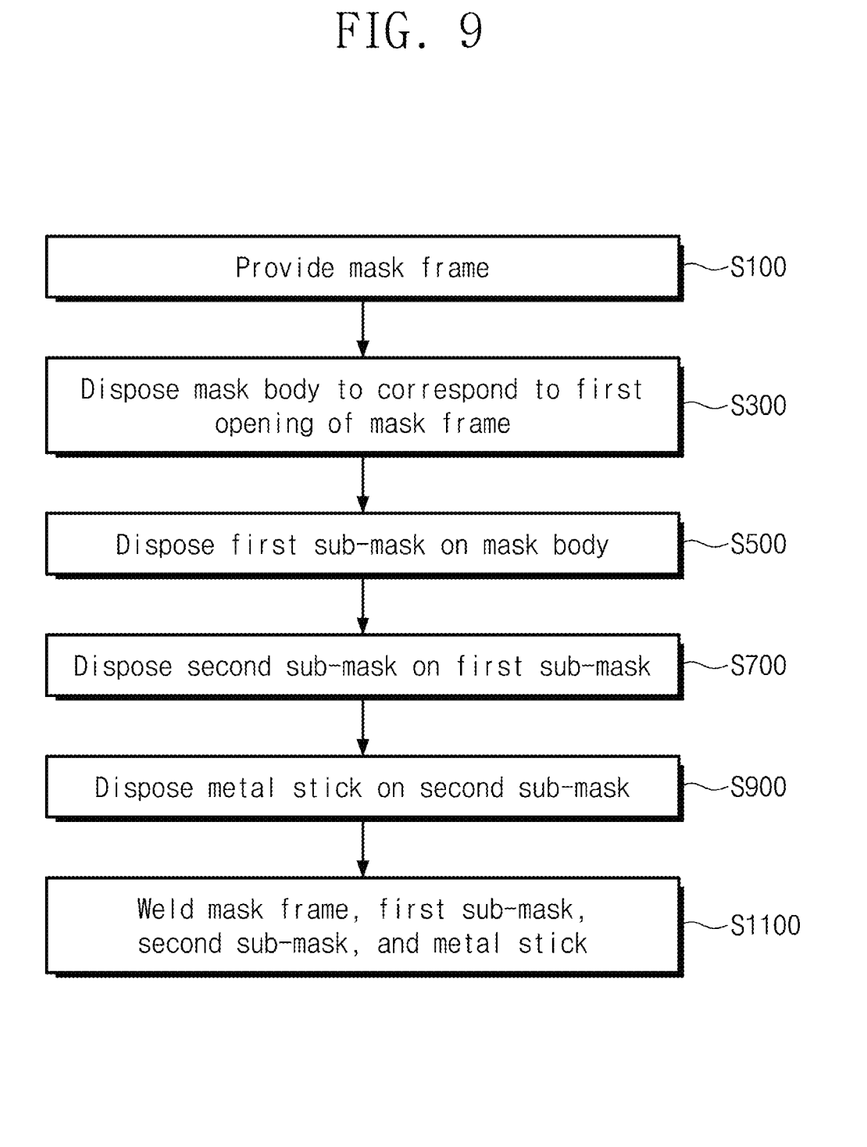
FIG. 9 is a flowchart showing a method of manufacturing a mask assembly according to an embodiment of the present disclosure.

FIG. 9 is a flowchart showing a method of manufacturing a mask assembly according to an embodiment of the present disclosure. FIGS. 10 to 14 are views schematically showing processes of the manufacturing method of the mask assembly. Hereinafter, the manufacturing method of the mask assembly will be described in detail with reference to FIGS. 9 to 14. Features of the mask assembly described with reference to FIGS. 1 to 8 are not described again, and features of the manufacturing method of the mask assembly are described in detail.

Referring to FIG. 9, the manufacturing method of the mask assembly includes providing the mask frame (S100), disposing the mask body to correspond to the first opening of the mask frame (S300), disposing the first sub-mask on the mask body (S500), disposing the second sub-mask on the first sub-mask (S700), disposing a metal stick on the second sub-mask (S900), and welding the mask frame, the first sub-mask, the second sub-mask, and the metal stick (S1100).

Figure 10:
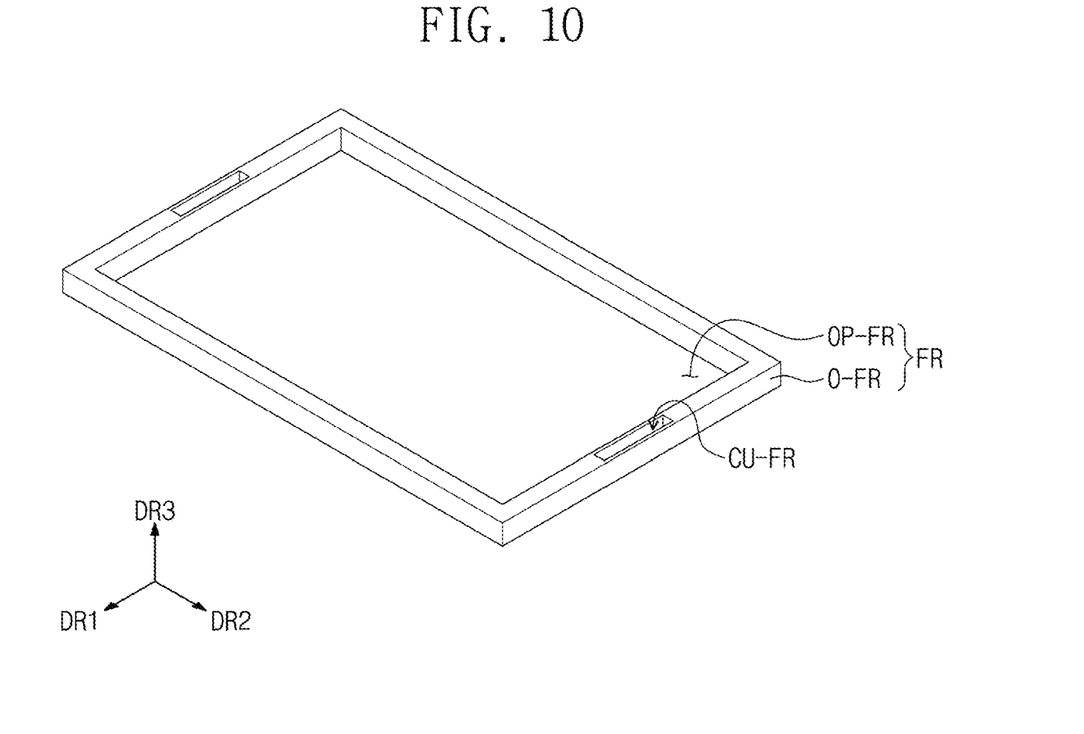
FIG. 10 is a view schematically showing a process of a manufacturing method of a mask assembly.
Figure 11:
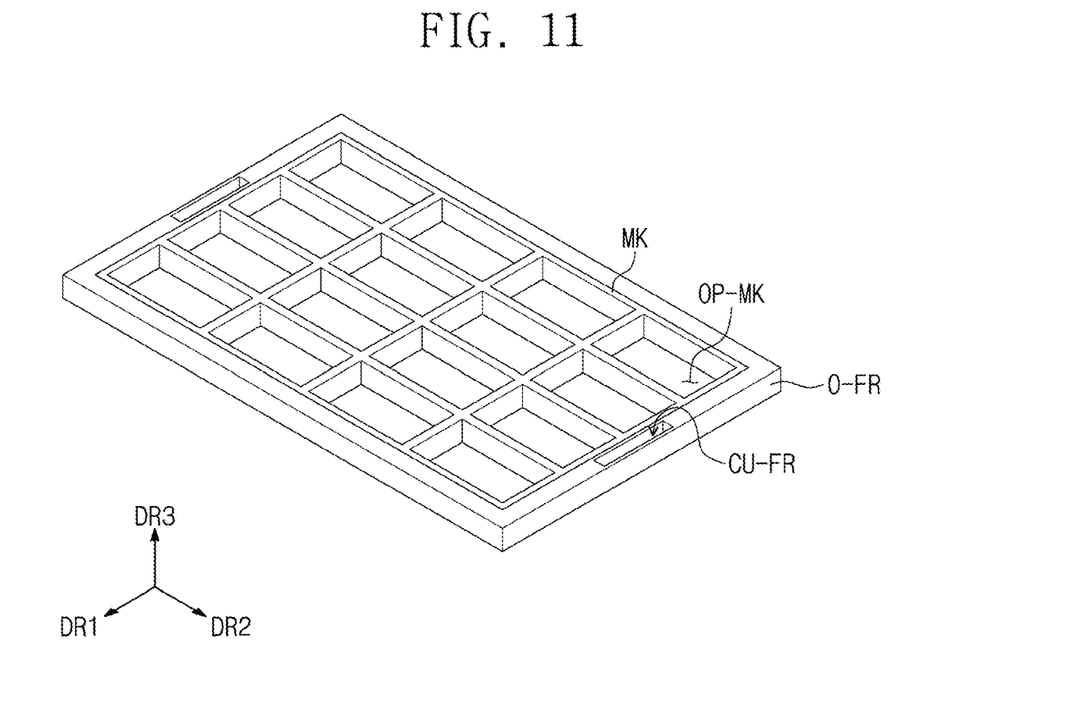
FIG. 11 is a view schematically showing a process of a manufacturing method of a mask assembly.

FIG. 10 is a view schematically showing the providing of the mask frame (S100). FIG. 11 is a view schematically showing the disposing of the mask body to correspond to the first opening of the mask frame (S300). Referring to FIGS. 10 and 11, The manufacturing method of the mask assembly may include the disposing the mask body MK to correspond to the first opening OP-FR of the mask frame FR (S300).

Figure 12:
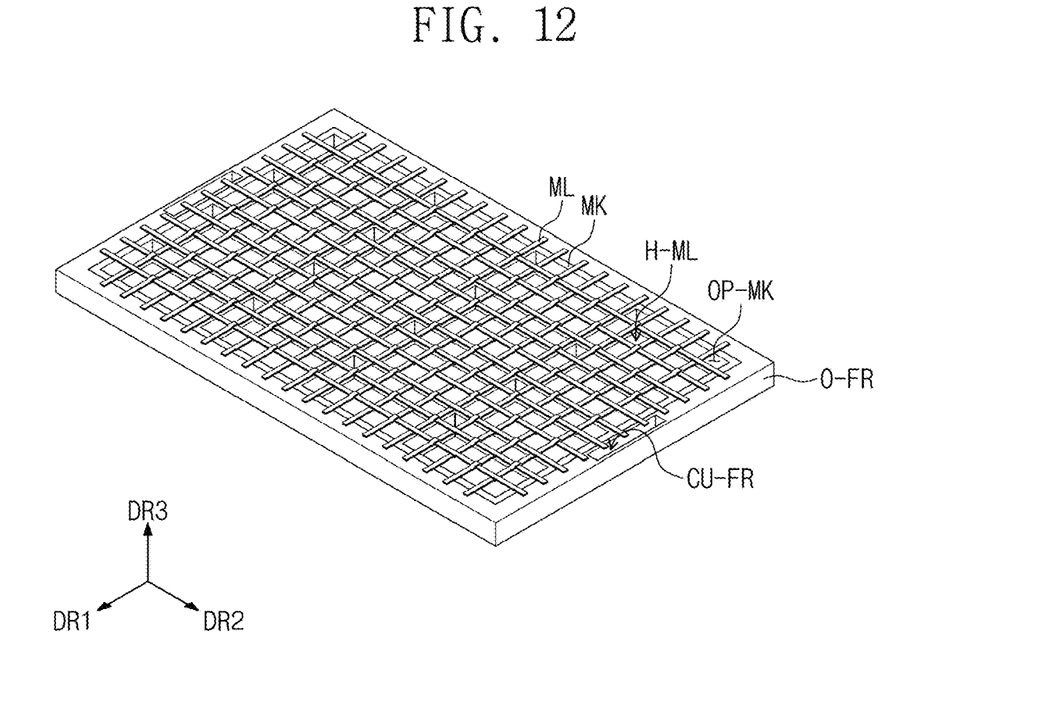
FIG. 12 is a view schematically showing a process of a manufacturing method of a mask assembly.

FIG. 12 is a view schematically showing the disposing of the first sub-mask on the mask body (S500). Referring to FIG. 12, the first sub-mask ML may be disposed to overlap the entirety of the mask body MK by the disposing of the first sub-mask ML on the mask body MK in a plan view. The first sub-mask ML may be disposed to partially overlap the outer frame O-FR by the disposing of the first sub-mask ML on the mask body MK in a plan view.

The disposing of the first sub-mask ML on the mask body MK may include tensioning the first sub-mask ML such that the concave portion CU-FR defined in the outer frame O-FR overlaps the first sub-mask ML in a plan view. In the tensioning of the first sub-mask ML, the first sub-mask ML may be tensioned in both the first direction DR1 and the second direction DR2 such that the first sub-mask ML overlaps the entirety of the mask body MK in a plan view. Although not shown in figures, the tensioning of the first sub-mask ML may be performed by applying heat to the first sub-mask ML. However, this is merely one example, and the method of tensioning the first sub-mask ML according to the invention should not be limited thereto or thereby.

The tensioning of the first sub-mask ML may be a process of tensioning the first sub-mask ML such that the first sub-mask ML is aligned with the mask body MK and the mask frame FR to perform the following welding process.

Figure 13:
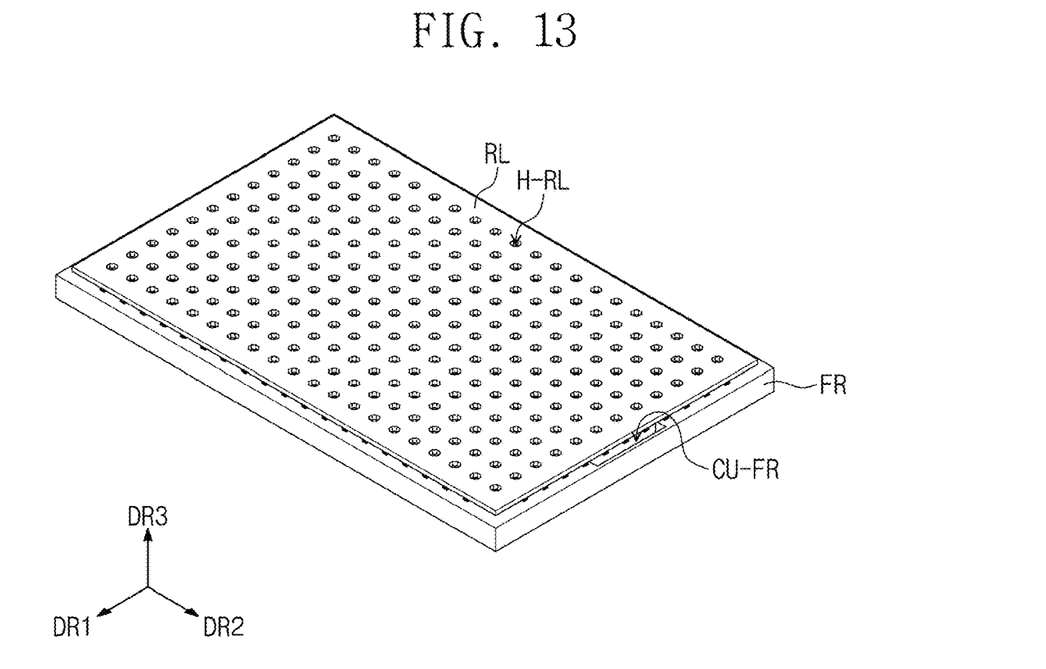
FIG. 13 is a view schematically showing a process of a manufacturing method of a mask assembly.

FIG. 13 is a view schematically showing the disposing of the second sub-mask on the first sub-mask. Referring to FIGS. 13 and 4, the disposing the second sub-mask RL on the first sub-mask ML is performed to allow the third openings H-ML defined in the first sub-mask ML to correspond to the fourth openings H-RL, respectively, defined in the second sub-mask RL.

The disposing of the second sub-mask RL on the first sub-mask ML may include tensioning the second sub-mask RL such that the concave portion CU-FR of the mask frame FR overlaps the second sub-mask RL in a plan view and the third openings H-ML overlap the fourth openings H-RL, respectively. The tensioning of the second sub-mask RL may be a process of tensioning the second sub-mask RL in both the first direction DR1 and the second direction DR2 such that the second sub-mask RL overlaps the entirety of the mask body MK in a plan view. Although not shown in figures, the tensioning of the second sub-mask RL may be the tensioning of the second sub-mask RL by applying heat to the second sub-mask RL. However, this is merely one example, and the method of tensioning the second sub-mask RL according to the invention should not be limited thereto or thereby.

The tensioning of the second sub-mask RL may be a process to align the second sub-mask RL with the mask body MK, the mask frame CU-FR, and the first sub-mask ML to perform the following welding process.

Figure 14:
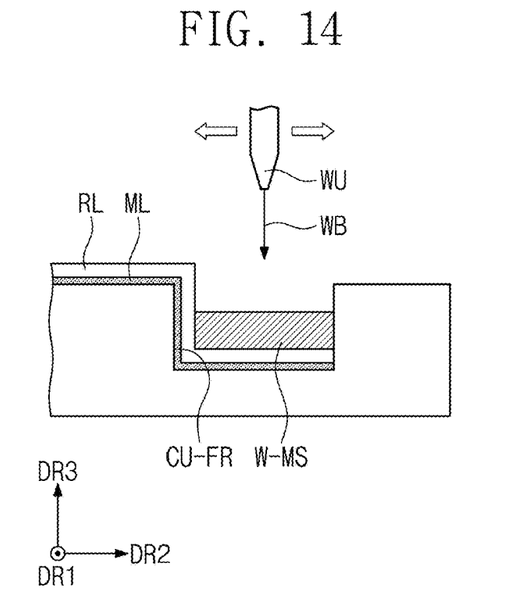
FIG. 14 is a view schematically showing a process of a manufacturing method of a mask assembly.

FIG. 14 is a view schematically showing the welding of the mask frame, the first sub-mask, the second sub-mask, and the metal stick (S1100). The disposing of the metal stick on the second sub-mask (S900) and the welding of the mask frame, the first sub-mask, the second sub-mask, and the metal stick (S1100) will be described with reference to FIG. 14.

Referring to FIG. 14, the manufacturing method of the mask assembly may further include disposing the metal stick W-MS on the second sub-mask As shown in FIG. 13, the first sub-mask ML and the second sub-mask RL are not disposed in the concave portion CU-FR, however, shown in FIG. 14, the metal stick W-MS is disposed on the second sub-mask RL. Accordingly, the first sub-mask ML, the second sub-mask RL, and the metal stick W-MS may be disposed in the concave portion CU-FR.

The manufacturing method of the mask assembly may further include the welding of the mask frame, the first sub-mask, the second sub-mask, and the metal stick (S1100). A welding unit WU disposed above the metal stick W-MS may emit a welding beam WB to weld the mask frame FR, the first sub-mask ML, the second sub-mask RL, and the metal stick W-MS. Since the second sub-mask RL is formed of or includes the polymer material, the second sub-mask RL may be damaged when it is directly welded. According to an embodiment, since the metal stick W-MS is used in the welding process of the manufacturing method of the mask assembly, a welding strength may be improved compared with a case where the welding process is performed directly on the second sub-mask RL.

Figure 15:
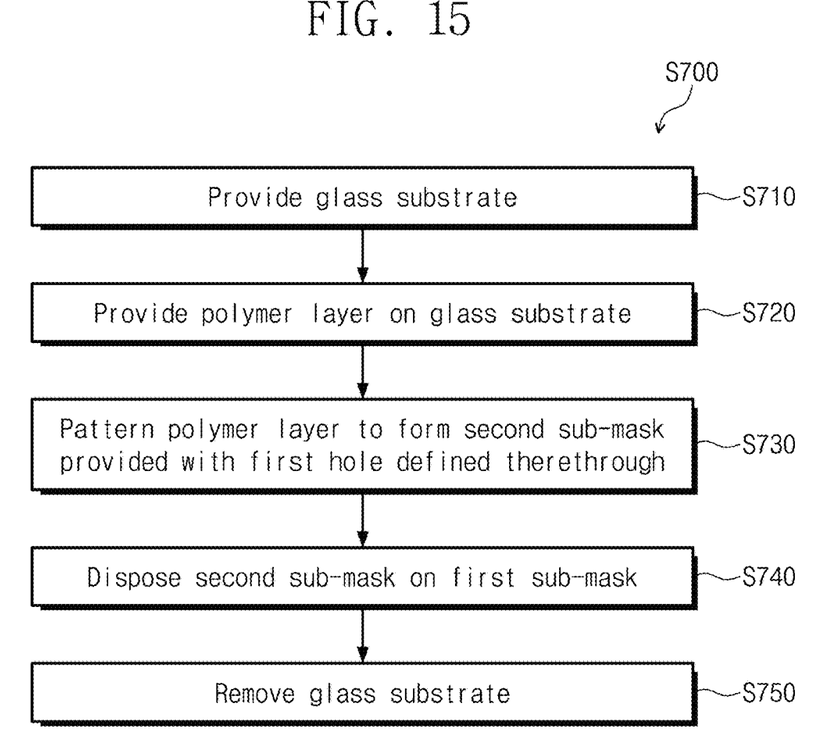
FIG. 15 is a flowchart showing a method of disposing a second sub-mask on a first sub-mask according to an embodiment of the present disclosure.
Figure 16:
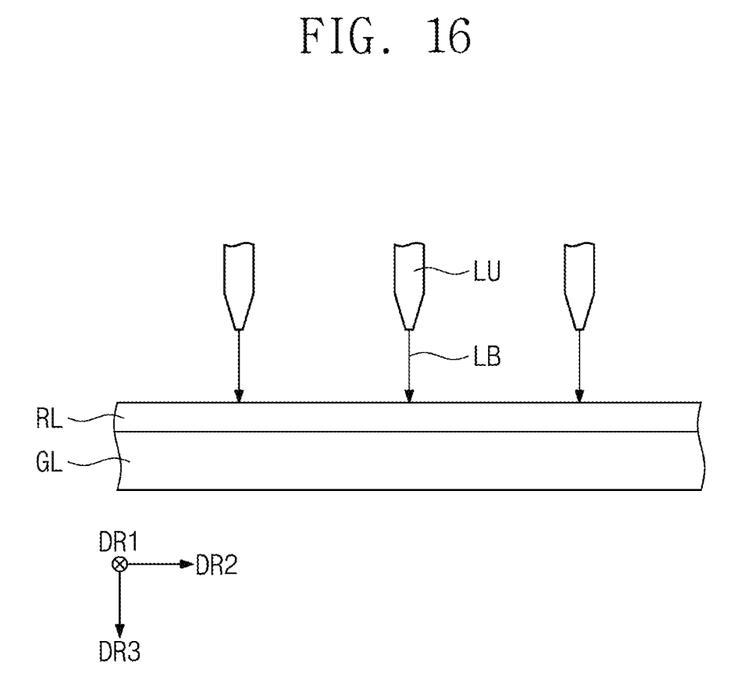
FIG. 16 is a view showing a process of the method of FIG. 15.
Figure 17:
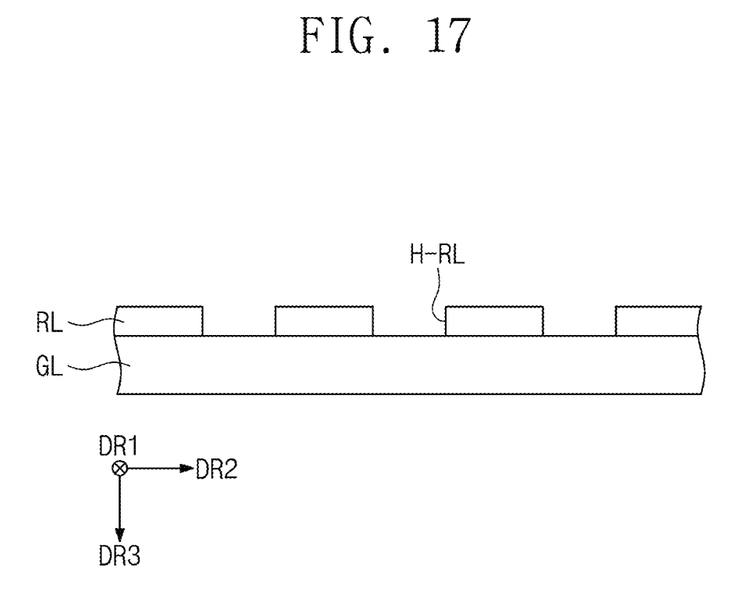
FIG. 17 is a view showing a process of the method of FIG. 15.
Figure 18:
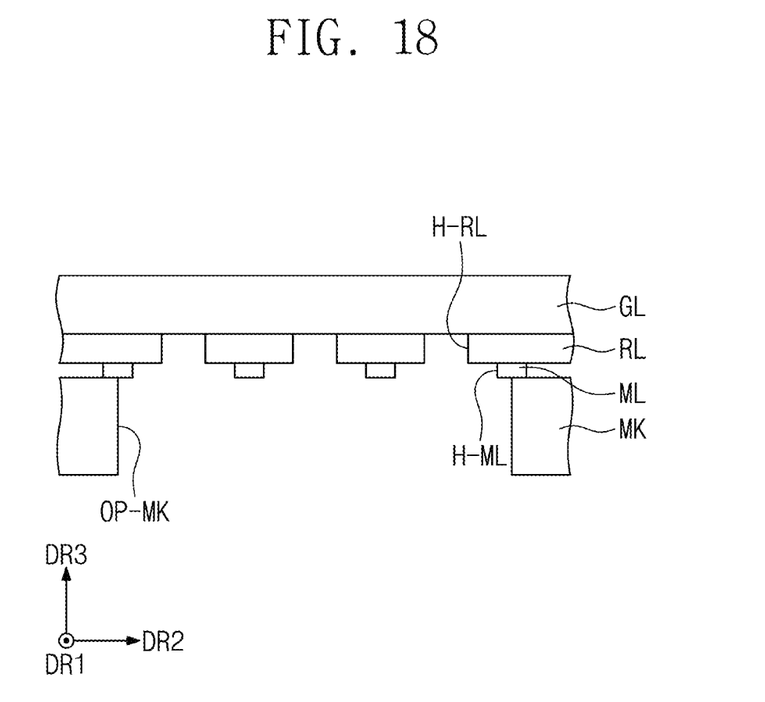
FIG. 18 is a view showing a process of the method of FIG. 15.

FIG. 15 is a flowchart showing the disposing of the second sub-mask on the first sub-mask (S700) in the manufacturing method of the mask assembly. FIGS. 16 to 18 are views schematically showing processes of FIG. 15.

Referring to FIG. 15, the disposing of the second sub-mask on the first sub-mask (S700) in the manufacturing method of the mask assembly may include providing a glass substrate (S710), providing a polymer layer on the glass substrate (S720), patterning the polymer layer to define the fourth opening through the polymer layer and to form the second sub-mask (S730), disposing the second sub-mask on the first sub-mask (S740), and removing the glass substrate (S750).

FIG. 16 is a view schematically showing the patterning of the polymer layer to define the fourth opening through the polymer layer and to form the second sub-mask (S730). FIG. 17 is a view schematically showing the patterned polymer layer.

Referring to FIGS. 16 and 17, the forming of the second sub-mask by patterning the polymer layer to define the fourth opening through the polymer layer (S730) may include irradiating a laser beam LB onto the polymer layer W-RL disposed on the glass substrate GL using a laser unit LU. The polymer layer W-RL may include polyimide. FIG. 16 shows the patterning of the polymer layer W-RL using a laser etching method only, however, this is merely one example, and the present disclosure according to the invention should not be limited thereto or thereby. Although not shown in figures, according to another embodiment, the patterning of the polymer layer W-RL to form the second sub-mask RL (S730) may be performed by using a dry etching method.

FIG. 18 is a view schematically showing the disposing of the second sub-mask on the first sub-mask (S740). Referring to FIG. 18, the second sub-mask RL may be disposed on the first sub-mask ML such that the glass substrate GL is exposed to the outside. When the removing of the glass substrate (S750) is performed after the disposing of the second sub-mask on the first sub-mask (S740), the second sub-mask RL may be disposed on the first sub-mask ML without the glass substrate GL as shown in FIG. 3.

According to an embodiment, the mask assembly may include the mask body, the first sub-mask disposed on the mask body and including the metal material, and the second sub-mask disposed on the first sub-mask and including the polymer, and thus, the large-sized mask assembly having low weight may be provided.

According to an embodiment, the manufacturing method of the mask assembly may include the disposing of the first sub-mask including the metal material on the mask body and the disposing of the second sub-mask including the polymer on the first sub-mask, and thus, the large-sized mask assembly having low weight may be provided by the manufacturing method of the mask assembly.

Although the embodiments of the present disclosure have been described, it is understood that the present disclosure according to the invention should not be limited to these embodiments but various changes and modifications can be made by one ordinary skilled in the art within the spirit and scope of the present disclosure as hereinafter claimed.

Therefore, the disclosed subject matter should not be limited to any single embodiment described herein, and the scope of the present inventive concept shall be determined according to the attached claims.

What is claimed is:

1. A mask assembly comprising:
   a mask frame provided with a first opening defined through a center portion thereof and comprising an outer frame surrounding the first opening and provided with at least one concave portion defined therein;
   a mask body disposed to correspond to the first opening and provided with a plurality of second openings defined therethrough and having an area smaller than the first opening in a plan view;
   a first sub-mask disposed on the mask body, provided with a plurality of third openings defined therethrough over an entire area thereof, and comprising a metal material, wherein each of the plurality of third openings has an area smaller than each of the second openings in the plan view;
   a second sub-mask disposed on the first sub-mask, provided with a plurality of fourth openings defined therethrough over an entire area thereof, and comprising a polymer material, wherein each of the plurality of fourth openings has an area smaller than each of the third openings in the plan view; and
   a welding portion disposed on the second sub-mask and in each of the at least one concave portion.

2. The mask assembly of claim 1, wherein the second sub-mask comprises polyimide.

3. The mask assembly of claim 1, wherein the second sub-mask has a thermal expansion coefficient equal to or smaller than about 2 parts per million per degree in Celsius (ppm/° C.).

4. The mask assembly of claim 1, wherein the fourth openings are defined to correspond to the third openings, respectively.

5. The mask assembly of claim 1, wherein the second openings overlap the third openings in the plan view.

6. The mask assembly of claim 1, wherein the first sub-mask comprises:
   a plurality of first metal lines extending in a first direction and arranged in a second direction perpendicular to the first direction; and
   a plurality of second metal lines extending in the second direction and arranged in the first direction, and
   each of the first metal lines crosses each of the second metal lines.

7. The mask assembly of claim 6, wherein each of the first metal lines is interlaced with the second metal lines by alternately passing over and under, and each of the second metal lines is interlaced with the first metal lines by alternately passing over and under.

8. The mask assembly of claim 1, wherein each of the third openings has an area equal to or greater than an area of each of the fourth openings in the plan view.

9. The mask assembly of claim 1, wherein the first sub-mask has a thickness equal to or greater than about 2 μm and equal to or smaller than about 5 μm.

10. The mask assembly of claim 1, wherein the second sub-mask has a thickness equal to or greater than about 5 μm and equal to or smaller than about 30 μm.

11. The mask assembly of claim 1, wherein each of the at least one concave portion has a depth which is greater than a sum of a thickness of the first sub-mask, a thickness of the second sub-mask, and a thickness of the welding portion in a thickness direction of the outer frame.

12. The mask assembly of claim 1, wherein each of the at least one concave portion comprises a curved surface portion in a cross-section.

13. A mask assembly comprising:
 a mask frame provided with a first opening defined through a center portion thereof and comprising an outer frame surrounding the first opening and provided with at least one concave portion defined therein;
 a mask body disposed to correspond to the first opening and provided with a plurality of second openings defined therethrough and having an area smaller than the first opening in a plan view;
 a first sub-mask disposed on the mask body, provided with a plurality of third openings defined therethrough over an entire area thereof, and comprising a metal material, wherein each of the plurality of third openings has an area smaller than each of the second openings in the plan view;
 a second sub-mask disposed on the first sub-mask, provided with a plurality of fourth openings defined therethrough over an entire area thereof, and comprising a polymer material, wherein each of the plurality of fourth openings has an area smaller than each of the third openings in the plan view; and
 at least one welding portion disposed on the second sub-mask,
 wherein the outer frame comprises:
  a first portion which overlaps the first sub-mask, the second sub-mask, and the welding portion in the plan view; and
  a second portion which overlaps the first sub-mask and the second sub-mask and does not overlap the welding portion in the plan view,
  wherein the first portion has a thickness smaller than a thickness of the second portion.

14. The mask assembly of claim 13, wherein the at least one concave portion is provided with plural, the first portion is provided with the plurality of concave portions recessed in a thickness direction, the welding portion is provided in plural, and the welding portions correspond to the plurality of concave portions, respectively.

15. The mask assembly of claim 13, wherein the second sub-mask comprises polyimide.

16. The mask assembly of claim 13, wherein the mask frame and the mask body comprise a same metal material.

17. The mask assembly of claim 16, wherein the metal material is Invar.

* * * * *